United States Patent
Zohar et al.

(10) Patent No.: US 7,430,641 B2
(45) Date of Patent: Sep. 30, 2008

(54) SYSTEM METHOD AND CIRCUIT FOR RETRIEVING INTO CACHE DATA FROM ONE OR MORE MASS DATA STORAGE DEVICES

(75) Inventors: Ofir Zohar, Alfe-Menashe (IL); Yaron Revah, Tel-Aviv (IL); Haim Helman, Ramat Gan (IL); Dror Cohen, Petach-Tikva (IL); Shemer Schwartz, Herzelia (IL)

(73) Assignee: XIV Ltd., Tel-Aviv (IL)

( * ) Notice: Subject to any disclaimer, the term of this patent is extended or adjusted under 35 U.S.C. 154(b) by 524 days.

(21) Appl. No.: 10/974,236

(22) Filed: Oct. 27, 2004

(65) Prior Publication Data
US 2006/0031635 A1    Feb. 9, 2006

Related U.S. Application Data

(63) Continuation-in-part of application No. 10/914,746, filed on Aug. 9, 2004.

(51) Int. Cl.
*G06F 12/00*    (2006.01)
(52) U.S. Cl. ........................... 711/138; 711/154
(58) Field of Classification Search ............... 711/137, 711/154, 113, 112
See application file for complete search history.

(56) References Cited

U.S. PATENT DOCUMENTS

| | | | |
|---|---|---|---|
| 6,115,796 A * | 9/2000 | Hayek et al. | 711/146 |
| 6,381,677 B1 * | 4/2002 | Beardsley et al. | 711/137 |
| 6,760,817 B2 * | 7/2004 | Arimilli et al. | 711/137 |
| 6,918,009 B1 * | 7/2005 | Sato et al. | 711/137 |
| 6,963,954 B1 * | 11/2005 | Trehus et al. | 711/137 |
| 7,234,041 B2 * | 6/2007 | Lin | 712/207 |
| 2003/0212859 A1 * | 11/2003 | Ellis et al. | 711/114 |

* cited by examiner

*Primary Examiner*—Pierre-Michel Bataille
(74) *Attorney, Agent, or Firm*—Katten Muchin Rosenman LLP

(57) ABSTRACT

According to some embodiments of the present invention, a data storage system may include a plurality of controllers connected or otherwise associated with one or more mass data storage devices. One controller may signal to one or more other controllers an indication as for which data blocks it has received requests. A prefetch decision module on a controller may decide to prefetch some or all of the data blocks associated with a given logical data unit based on data block requests it has received and based on requests received by other controllers. A prefetch decision module on a first controller may signal one or more other controllers to prefetch one or more data blocks associated with a given logical unit and which reside on mass storage devices either connected or otherwise associated with each of the one or more controllers.

6 Claims, 4 Drawing Sheets

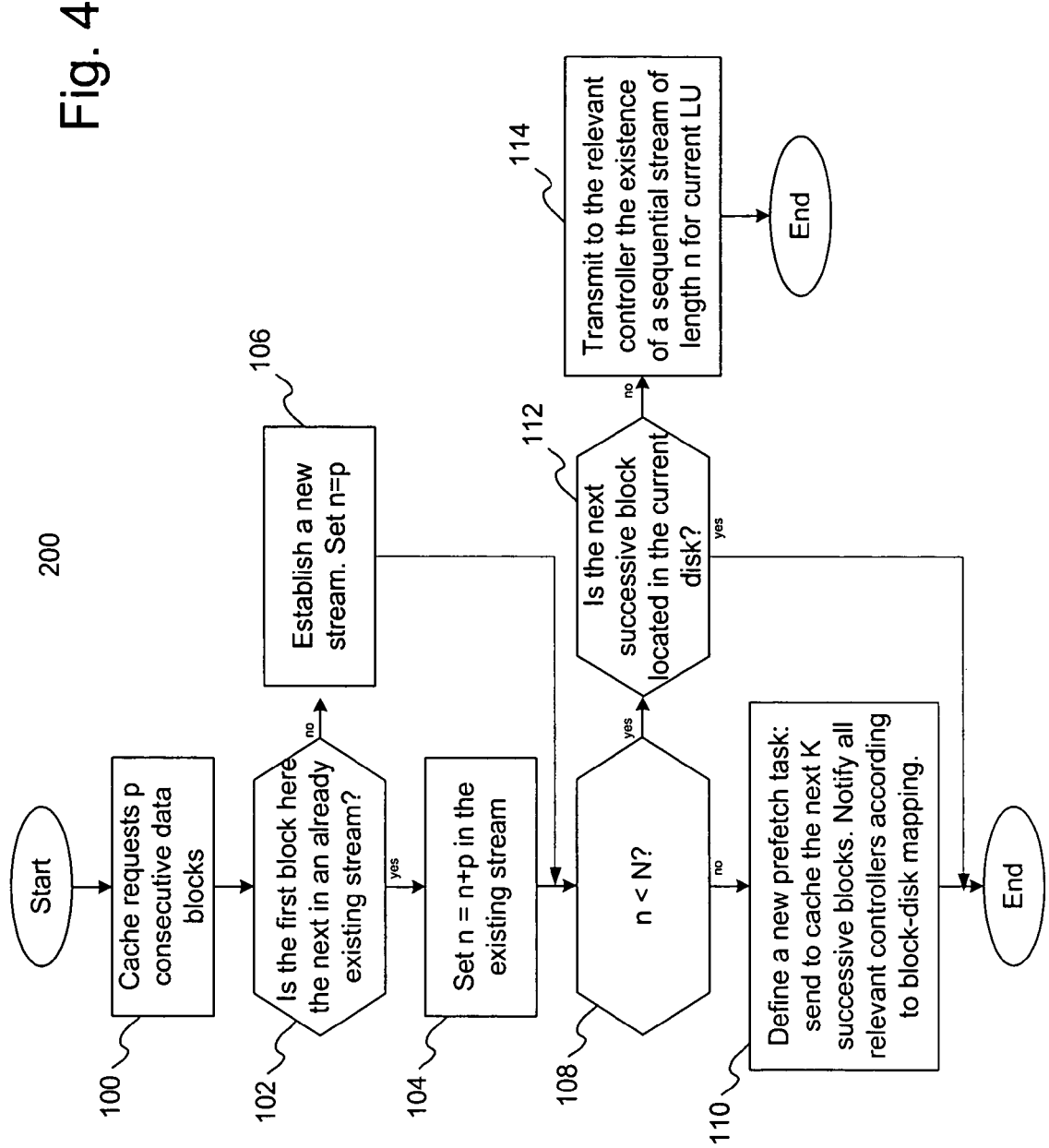

SYSTEM METHOD AND CIRCUIT FOR RETRIEVING INTO CACHE DATA FROM ONE OR MORE MASS DATA STORAGE DEVICES

RELATED APPLICATIONS

This U.S. Utility patent application is a Continuation-In-Part of U.S. patent application Ser. No. 10/914,746, filed on Aug. 9, 2004, which is hereby incorporated by reference in its entirety.

FIELD OF THE INVENTION

The present invention relates generally to the field of digital memory storage. More specifically, the present invention relates to a system, method and circuit for retrieving data into a cache memory from one or more mass data storage devices.

BACKGROUND OF THE INVENTION

A data storage system is typically able to service "data write" or "data read" requests issued by a host computer. A host may be connected to the storage system's external controller or interfaces (IF), through various channels, either directly or via a data network, that transfer both data and control information (i.e. control signals). Physical non-volatile media in which data may be permanently or semi-permanently stored includes arrays of disk devices, magnetic or optical, which are relatively less expensive than semiconductor based volatile memory (e.g. Random Access Memory) but are relatively much slower in being accessed. As the prices of fabrication and production of ever-larger arrays of non-volatile memory cells continue dropping, these arrays may also be used and considered to be mass data storage media or device.

A cache memory is a high-speed buffer typically located between an IF and its associated mass storage device(s), which is meant to reduce the overall latency of Input/Output activity between the storage system and a host accessing data on the storage system. Whenever a host requests data stored in a memory system, the request may be served with significantly lower latency if the requested data is already found in cache, since this data does not have to be located and retrieved from the relatively slower mass data storage device(s). For example, as of the year 2004, speeds of IO transactions involving disk activity are typically on the order of 5-10 milliseconds, whereas IO speeds involving cache (e.g. RAM memory) access are on the order of several nanoseconds.

The relatively high latency associated with disk activity derives from the mechanical nature of the disk devices. In order to retrieve requested data from a disk based device, a disk controller must first cause a disk reading arm to physically move to a track containing the requested data. Once the head of the arm has been placed at the beginning of a track containing the data, the time required to read the accessed data on the relevant track is relatively very short, on the order of several microseconds.

One criterion or parameter which is often used to measure the efficiency of a cache memory system or implementation is a criterion referred to as a hit ratio. A hit ratio of a specific implementation is the percentage of "data read" requests issued by the host that are already found in cache and that consequently did not require time intensive retrieval from disk operations. An ideal cache system would be one reaching a 100% hit ratio. One way known in the art to improve performance by means of enhancing the hit ratio, includes implementing intelligent algorithms that attempt to guess in advance which portions of data stored on a disk device will soon be requested by a host. Once it has been estimated/guessed that some specific data will soon be requested, in anticipation of the request, the algorithm(s) "pre-fetch" the data into the cache, prior to actually receiving a request for the data.

In some memory storage and retrieval systems, one or more cache memories are connected to or otherwise associated with a plurality of mass data storage devices (e.g. disk devices). The cache circuits and the associated prefetch circuits in such systems may not be aware that data to be cached may be stored on different mass data storage devices, and the criteria which dictate which blocks of data are to be perfected into the cache may be indifferent to the fact that the data is divided between a plurality of mass data storage devices. In addition, such systems, and in particular the cache circuits and the associated prefetch circuits of such systems, may be incapable of identifying prefetch triggers and servicing prefetch requests referring to data stored on more than one disk drive or to create a prefetch cluster of data blocks or data units comprised of data blocks (or units) retrieved from two or more different mass data storage devices.

There is a need for a method, circuit and system for retrieving some or all of the data blocks associated with a logically related set of data, such as a file or group of related files, from two or more different mass storage devices into one or more caches. Any logically related set of data, that is data (e.g. data blocks, data bytes, etc) which has some kind of functional autonomy within the system, including but not limited to the fact that they can be read together as a whole.

SUMMARY OF THE INVENTION

According to some embodiments of the present invention, there is provided a system and a method of retrieving some or all of the data blocks of a logical unit into a cache from one or more mass storage devices. According to some embodiments of the present invention, a data storage system may include a plurality of mass storage device controllers, and each of the controllers may be connected or otherwise associated with one or more mass storage devices. Some or all of the controllers may be connected to a cache memory unit or to a cluster of associated cache memory units. Two or more of the controllers may have access to the same cache memory unit or to related cache memory units. A host computer may access data from one or more mass data storage devices through an interface connected to a cache memory, or a cluster of cache memories, connected or otherwise associated with one or more controllers connected to the one or more mass data storage devices.

Some or all of the mass data storage device controllers may include communication modules which allow one mass data storage device controller to signal another, and some or all of the mass data storage device controllers may include a prefetch decision module. Some or all of the cache units may have controllers, which controllers may include communication modules allowing one cache controller to signal another, and some or all of the cache controllers may include a prefetch decision module. Some or all of the interfaces have a controller including a communication module which allows one interface controller to signal another, and some or all of the interface controllers may include a prefetch decision module. The term controller, as used in this patent application, may refer to any of the above three mentioned types of controllers, or to any other controller or control logic which may be associated with a data storage system.

According to some embodiments of the present invention, upon receiving a request for one or a set of data blocks associated with a given logical unit of data, a prefetch decision module associated with a first controller, which in turn may be connected or otherwise associated with a fist mass storage device (e.g. magnetic or optical disks, non-volatile memory array, or any other non-volatile data storage medium based memory device) may cause all or part of the logical unit to be retrieved from one or more mass storage devices and placed in cache (i.e. prefetched). If all the data blocks to be prefetched reside on the first mass storage device, which is connected or otherwise functionally associated with the first controller, the controller may retrieve and place in cache all the data blocks to be prefetched. If, however, the data to be prefetched resides on a mass storage device connected or otherwise functionally associated with a second controller, the first controller may signal the second controller to retrieve and place the relevant data blocks in cache.

According to some embodiments of the present invention, the first controller may include a data map or block disk map. The map may include information indicating which data blocks reside on which one of a plurality of mass storage devices. According to some embodiments of the present invention, the first controller may determine which one or more of a number of other controllers to signal based on information contained within the data map. For example, if a prefetch decision module on a first controller determines that the conditions to prefetch some or all the data blocks of a given logical unit exist, but based on information in the data map it is found that certain blocks of the logical unit to be prefetched reside on one or more mass storage devices not connected to or associated with the first controller, a communication module on the first controller may signal communication modules on the one or more relevant controllers connected to the mass storage devices. In response to the signal from the first controller, the one or more controllers connected to the mass storage devices on which the relevant data blocks reside, may cause those data blocks to be place in cache.

According to some embodiments of the present invention, upon receiving one or more requests for one or more data blocks associated with a given logical unit, a first controller may signal one or more other controllers a signal indicating the receipt of the one or more requests for data blocks associated with the given logical unit. A prefetch decision module on a second controller may receive the signal sent by the first controller. Based the received signal, and based on one or more requests received by the second controller for one or more data blocks associated with the given logical unit, a prefetch decision module associated with the second controller may decide to prefetch some or all of the blocks associated with the given logical unit. After receiving a signal from a first controller indicating that the first controller has received one or more requests for data blocks associated with a given logical unit, a prefetch decision module on each of two or more other controllers may initiate prefetch operations for data blocks associated with the given logical unit and residing on mass data storage devices with which the controller is connected or otherwise associated. A prefetch decision module on one controller may signal one or more other controllers, instructing the other controllers to prefetch into cache data blocks associated with a logical unit which the first prefetch decision module decided to prefetch.

According to some embodiments of the present invention, some or all of a logical unit or of a data segment may be retrieved into cache from a disk or from a plurality of disks after a threshold number of data blocks associated with the data segment are requested, either within a single request or within some number of consecutive requests.

According to further embodiments of the present invention, some or all of a data segment or of a logical unit may be retrieved in to cache from a mass data storage device or from a plurality of mass data storage devices after one or more data blocks constituting a prefetch trigger are requested within a single request or within some number of consecutive requests.

According to some embodiments of the present invention, a requested data block may be deemed associated with a data segment or with a logical unit if the requested data block is within the data segment or within the logical unit. According to some embodiments of the present invention, a controller may be adapted to compare the physical location or address of a requested data block with data within a data table or map indicating the physical location or address of various data segments or of various logical units. By comparing the physical location or address of a requested data block with data within a data table or map indicating the physical location or address of various data segments or of various logical units, a controller may determine with which data segment or with which logical unit a requested data block may be associated, and may retrieve into cache some or all of the data segment or some or all of the logical unit.

According to some embodiment of the present invention, a prefetch decision module may initiate the placement of some or all of the data blocks of a logical unit into a cache after one or a set of blocks of the logical unit, having either a specific; (1) location, (2) sequence, (3) pattern or (4) order within the logical unit, have been requested. According to some embodiments of the present invention, a prefetch decision module may establish one or more triggers for one group of logical units, while establishing another one or more triggers for another group of logic units. The triggers for each group of logical units may be completely different from one another, or some groups may share common triggers. Triggers for one or more logical units may be dynamically adjusted during operation to suite operational conditions.

According to some embodiments of the present invention, a decision within a first controller to prefetch one or more data blocks associated with a logical unit may be at least partially based on requests for data blocks received by a second controller. Using their respective communication modules, a first controller may indicate to a second controller for which data blocks it has received requests. Upon receiving an indication from the first controller as to which data blocks have been requested through the first controller, a second controller may determine to trigger the prefetching of some or all of the data blocks associated with a given logical unit. The second controller's prefetch decision module may include a prefetch trigger which takes into account data block requests received by the second controller combined with data block requests received through other controllers.

As should be clear from the above description, according to various embodiments of the present invention, the decision logic to prefetch data blocks associated with a given logical data unit, and the mechanism for prefetching the data blocks into cache, may reside within each of two or more controllers. The two or more controllers may be mass data storage device controllers, cache controllers, interface controllers, or any other type controllers associated with a data storage system.

The present invention will be more fully understood from the following detailed description, taken together with the drawings, a brief description of which is given below.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a flow chart illustrating a method of retrieving data into a cache memory from one or more mass data storage devices, in accordance with some embodiments of the present invention.

Figure 1:
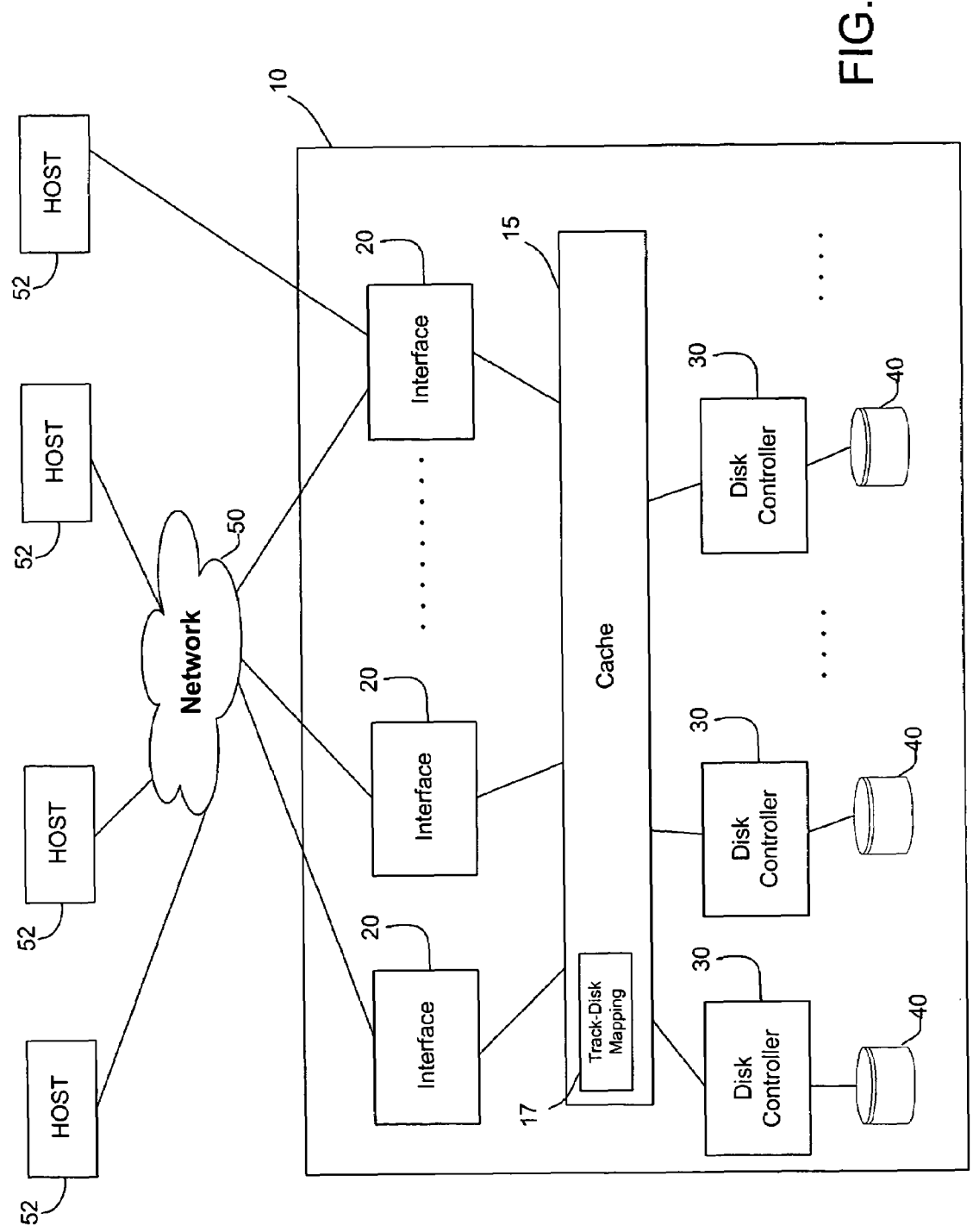
FIG. 1 is a schematic block diagram of a data storage system, including multiple interfaces, a cache unit, multiple mass data storage devices, and controllers connected or otherwise associated with each of the mass data storage devices, operable according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims the term prefetch or the like may be used to describe an action or the corresponding process in which a decision is made, based on information about recent IO activity in a storage system, to "prefetch" data into cache, namely, to bring into cache data that has not yet been requested by the host but that is likely to be requested within a short period of time. The prefetching process may include a decision to prefetch and the actual operation of prefetching the data to cache. Unless specifically stated otherwise, throughout the specification and the claims the term prefetch or the like shall be used to mean the decision to prefetch and/or the actual operation of prefetching the data to cache.

In the description of the present invention reference is made to a system that stores data on its permanent media in individually-accessible blocks. In such a system strings of consecutive blocks may constitute the basic address spaces in the system. These strings of consecutive blocks may constitute the basic address spaces in the system and will be referred to herein as logical units (LUs). It must be stressed, however, that this is only one possible way to organize and transmit data within storage systems to which some embodiments of the present invention may be applicable to. Those of ordinary skill in the art may appreciate that some embodiments of the present invention described hereinbelow and illustrated in the attached Figures may be readily modified to accommodate the various configurations of such storage systems and methods. One example of such a storage system is a system where the basic storage unit is a byte, and the basic address space is a file.

According to some embodiments of the present invention, there is provided a system and a method of retrieving some or all of the data blocks of a logical unit into a cache from one or more mass storage devices. According to some embodiments of the present invention, a data storage system may include a plurality of mass storage device controllers, and each of the controllers may be connected or otherwise associated with one or more mass storage devices. Some or all of the controllers may be connected to a cache memory unit or to a cluster of associated cache memory units. Two or more of the controllers may have access to the same cache memory unit or to related cache memory units. A host computer may access data from one or more mass data storage devices through an interface connected to a cache memory, or a cluster of cache memories, connected or otherwise associated with one or more controllers connected to the one or more mass data storage devices.

Some or all of the mass data storage device controllers may include communication modules which allow one mass data storage device controller to signal another, and some or all of the mass data storage device controllers may include a prefetch decision module. Some or all of the cache units may have controllers, which controllers may include communication modules allowing one cache controller to signal another, and some or all of the cache controllers may include a prefetch decision module. Some or all of the interfaces have a controller including a communication module which allows one interface controller to signal another, and some or all of the interface controllers may include a prefetch decision module. The term controller, as used in this patent application, may refer to any of the above three mentioned types of controllers, or to any other controller or control logic which may be associated with a data storage system.

According to some embodiments of the present invention, upon receiving a request for one or a set of data blocks associated with a given logical unit of data, a prefetch decision module associated with a first controller, which in turn may be connected or otherwise associated with a fist mass storage device (e.g. magnetic or optical disks, non-volatile memory array, or any other non-volatile data storage medium based memory device) may cause all or part of the logical unit to be retrieved from one or more mass storage devices and placed in cache (i.e. prefetched). If all the data blocks to be prefetched reside on the first mass storage device, which is connected or otherwise functionally associated with the first controller, the controller may retrieve and place in cache all the data blocks to be prefetched. If, however, the data to be prefetched resides on a mass storage device connected or otherwise functionally associated with a second controller, the first controller may signal the second controller to retrieve and place the relevant data blocks in cache.

According to some embodiments of the present invention, the first controller may include a data map or block disk map. The map may include information indicating which data blocks reside on which one of a plurality of mass storage devices. According to some embodiments of the present invention, the first controller may determine which one or more of a number of other controllers to signal based on information contained within the data map. For example, if a prefetch decision module on a first controller determines that the conditions to prefetch some or all the data blocks of a given logical unit exist, but based on information in the data map it is found that certain blocks of the logical unit to be prefetched reside on one or more mass storage devices not connected to or associated with the first controller, a communication module on the first controller may signal communication modules on the one or more relevant controllers connected to the mass storage devices. In response to the signal from the first controller, the one or more controllers connected to the mass storage devices on which the relevant data blocks reside, may cause those data blocks to be placed in cache.

According to some embodiments of the present invention, upon receiving one or more requests for one or more data blocks associated with a given logical unit, a first controller may signal one or more other controllers a signal indicating the receipt of the one or more requests for data blocks associated with the given logical unit. A prefetch decision module on a second controller may receive the signal sent by the first controller. Based on the received signal, and based on one or more requests received by the second controller for one or more data blocks associated with the given logical unit, a prefetch decision module associated with the second controller may decide to prefetch some or all of the blocks associated with the given logical unit. After receiving a signal from a first controller indicating that the first controller has received one or more requests for data blocks associated with a given logical unit, a prefetch decision module on each of one or more other controllers may initiate prefetch operations for data blocks associated with the given logical unit and residing on mass data storage devices with which the controller is connected or otherwise associated. A prefetch decision module on one controller may signal one or more other controllers, instructing the other controllers to prefetch into cache data blocks associated with a logical unit which the first prefetch decision module decided to prefetch.

According to some embodiments of the present invention, some or all of a logical unit or of a data segment may be retrieved into cache from a disk or from a plurality of disks after a threshold number of data blocks associated with the data segment are requested, either within a single request or within some number of consecutive requests.

According to further embodiments of the present invention, some or all of a data segment or of a logical unit may be retrieved in to cache from a mass data storage device or from a plurality of mass data storage devices after one or more data blocks constituting a prefetch trigger are requested within a single request or within some number of consecutive requests.

According to some embodiments of the present invention, a requested data block may be deemed associated with a data segment or with a logical unit if the requested data block is within the data segment or within the logical unit. According to some embodiments of the present invention, a controller may be adapted to compare the physical location or address of a requested data block with data within a data table or map indicating the physical location or address of various data segments or of various logical units. By comparing the physical location or address of a requested data block with data within a data table or map indicating the physical location or address of various data segments or of various logical units, a controller may determine with which data segment or with which logical unit a requested data block may be associated, and may retrieve into cache some or all of the data segment or some or all of the logical unit.

According to some embodiments of the present invention, a prefetch decision module may initiate the placement of some or all of the data blocks of a logical unit into a cache after one or a set of blocks of the logical unit, having either a specific; (1) location, (2) sequence, (3) pattern or (4) order within the logical unit, have been requested. According to some embodiments of the present invention, a prefetch decision module may establish one or more triggers for one group of logical units, while establishing another one or more triggers for another group of logic units. The triggers for each group of logical units may be completely different from one another, or some groups may share common triggers. Triggers for one or more logical units may be dynamically adjusted during operation to suite operational conditions.

According to some embodiments of the present invention, a decision within a first controller to prefetch one or more data blocks associated with a logical unit may be at least partially based on requests for data blocks received by a second controller or a plurality of other controllers. Using their respective communication modules, a first controller may indicate to a second controller, or a plurality of other controllers, for which data blocks it has received requests. Upon receiving an indication from the first controller as to which data blocks have been requested through the first controller, a second controller, or a plurality of other controllers, may determine to trigger the prefetching of some or all of the data blocks associated with a given logical unit. The second controller's prefetch decision module may include a prefetch trigger which takes into account data block requests received by the second controller combined with data block requests received through other controllers.

As should be clear from the above description, according to various embodiments of the present invention, both the decision logic to prefetch data blocks associated with a given logical data unit, and the mechanism for prefetching the data blocks into cache, may reside within each of two or more controllers. Each the two or more controllers may be mass data storage device controllers, cache controllers, interface controllers, or any other type controllers associated with a data storage system.

Reference is made now to FIG. 1, which is a schematic block diagram of a data storage system, including multiple interfaces, a cache unit, multiple mass data storage devices (e.g. disks), and controllers connected or otherwise associated with each of the mass data storage devices, operable according to some embodiments of the present invention. As part of some embodiments of the present invention, one or more host computers 52 may be connected to storage system 10 through one or more ports, or through interfaces (IFs) 20, either directly or via a network 50. The interfaces 20 may be adapted to communicate with a cache memory 15.

As part of some embodiments of the present invention, data blocks written by hosts 52 may be saved in cache 15 and the write request generated by the host 52 may thus be acknowledged. The cache 15 may eventually copy the blocks into disk drives 40 where the blocks may be permanently or semi-permanently stored.

In accordance with some embodiments of the present invention, data blocks written by hosts 52 may be stored in one or more data disks 40 of the system. That is, some of the blocks may be written to one disk 40, while others may be written to one or more other disks 40. In accordance with some embodiments of the present invention, the system may include a block-disk map 17, which may determine a data block distribution scheme relating to the distribution of data blocks (segments or any other data units) between two or more disks 40 associated with the system 10. In accordance with some embodiments of the present invention, the data block distribution scheme may be determined in advance and may be fixed, or alternatively, may be dynamically adjusted in accordance with various parameters including but not limited to parameters relating to the performance of the storage system 10, for example workload balancing.

It should be noted that the block-disk map 17 of the present invention is not limited to determining the distribution of data blocks across two or more disks 40 associated with the system 10. Rather, in accordance with some embodiments of the present invention, the block-disk map 17 may determine the distribution scheme of any other suitable data unit across the two or more disks 40 associated with the system 10. Furthermore, in accordance with some embodiments of the present invention, the block-disk map 17 may be dynamically adjusted in response to variations in some parameters, including but not limited to parameters relating to the performance of the storage system 10, thereby causing the modification of the distribution scheme in accordance with which the data blocks may be distributed between the two or more disks 40 associated with the system 10.

In accordance with some embodiments of the present invention, the block-disk map 17 may be stored in cache 15. In accordance with further embodiments of the present invention additional copies of the block-disk map 17 may also be stored in each of the disk controllers 30, or as part of any controller associated with the system 10.

The block-disk map 17 may be static or it may be modified from time to time either within predetermined time or, in another example, following changes in the logical or physical configuration of the system 10. Any modification in mapping 17 may be communicated to the copies of the map 17 which may be stored in any and all the controllers 30.

In accordance with some embodiments of the present invention, upon receiving one or more blocks to be written to disks 40, the map 17 may be consulted to determine to which disk 40 each block or cluster of blocks (or other data unit) should be written. The cache 15 may then direct each block to the disk controller 30 corresponding to the disk drive 40 that had been determined to be responsible for storing that block or blocks.

Similarly, read requests generated by the hosts 52 may be likewise transmitted to cache 15. The cache 15 may initially check whether the requested data block or blocks is currently available in cache 15. In accordance with some embodiments of the present invention, in case the data block or blocks is already stored in cache 15, the data block or block may be transmitted from cache 15 to the interfaces 20 and from there to the hosts 52. In accordance with some embodiments of the present invention, in case that the requested data block or blocks is not in the cache 15, the cache 15 may consult the map 17 to determine where the data is stored (on which disk or disks, for example). The cache 15 may then request the data block or blocks from the controller(s) 30 corresponding to the disk drive(s) 40 where the data block or blocks is stored.

As part of some embodiments of the present invention, the IFs 20 may, for example, communicate with cache 15 over a first bus. The cache 15 may, for example, communicate with the disk controllers 30 over a second bus. Those of ordinary skill in the art may appreciate that using the configuration described above may enable a first disk controller 30 to communicate with a second disk controller 30 via a communication bus, directly or through another element connected to the bus.

It should be noted, however, that the configuration of the storage system 10 shown in FIG. 1 and discussed hereinabove with reference to FIG. 1 is exemplary in nature, and that other configurations of various storage systems may be used as part of some embodiments of the present invention.

Figure 2:
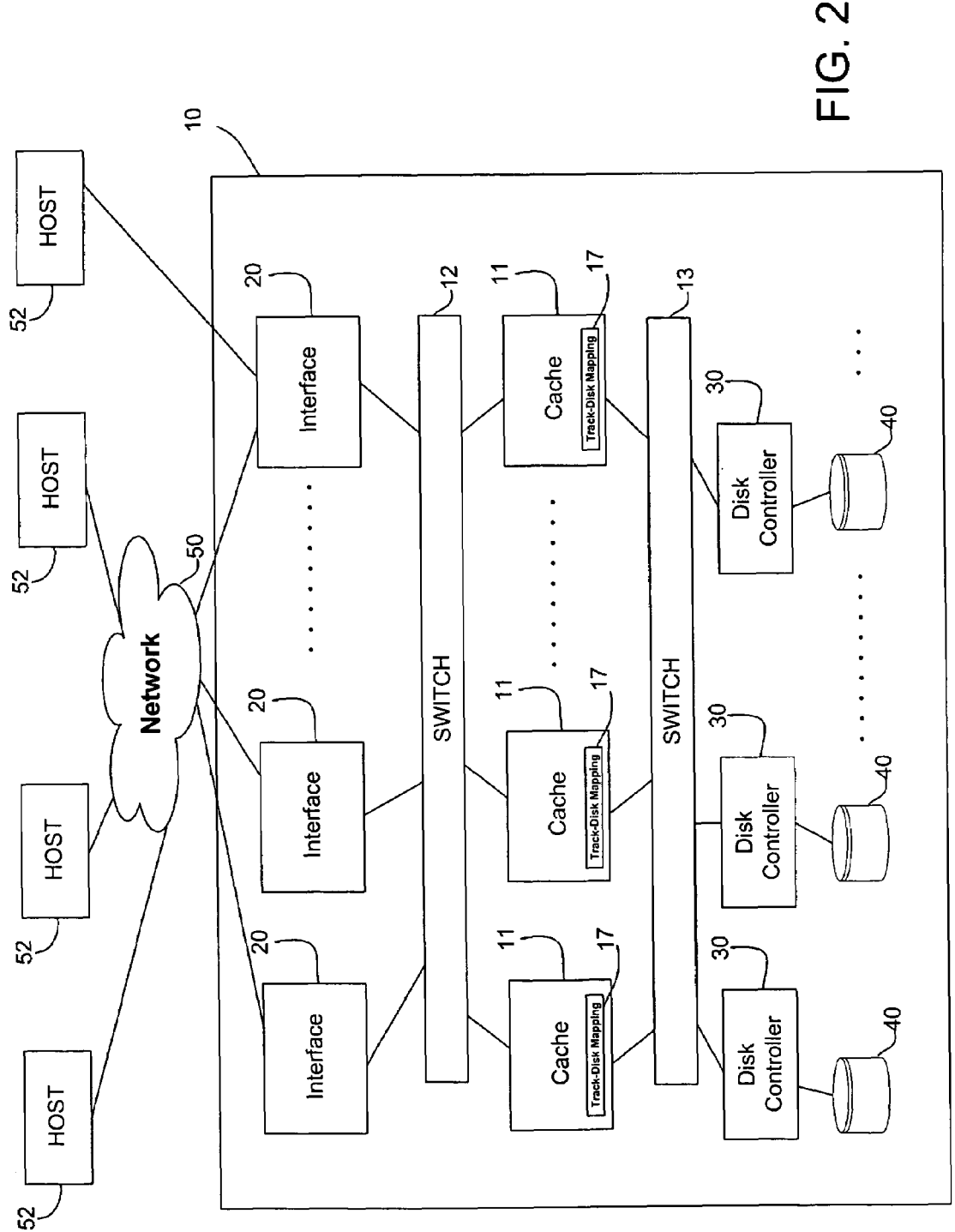
FIG. 2 is a schematic block diagram of a data storage system, including multiple interfaces, multiple cache units, multiple mass data storage devices, and controllers connected or otherwise associated with each of the mass data storage devices, operable according to some embodiments of the present invention.

Reference is now made to FIG. 2, which is a block diagram illustration of a system having a distributed cache, in accordance with some embodiments of the present invention. In the embodiment shown in FIG. 2 the cache 15 may include a cluster of several smaller-size memories 11 acting either independently or synchronously to provide distributed caching. In accordance with some embodiments of the present invention, each of the cache components 11 may include or may be otherwise associated with a copy of the block-drive map 17. As part of one exemplary embodiment of the present invention, the IF components 20 may communicate with the cache components 11 over a fabric switch 12, and the cache components 11 may communicate with the disk controllers 30 over a second fabric switch 13. In accordance with some embodiments of the present invention, the second switch 13 may also be configured to enable communication between disk controllers 30.

Figure 3:
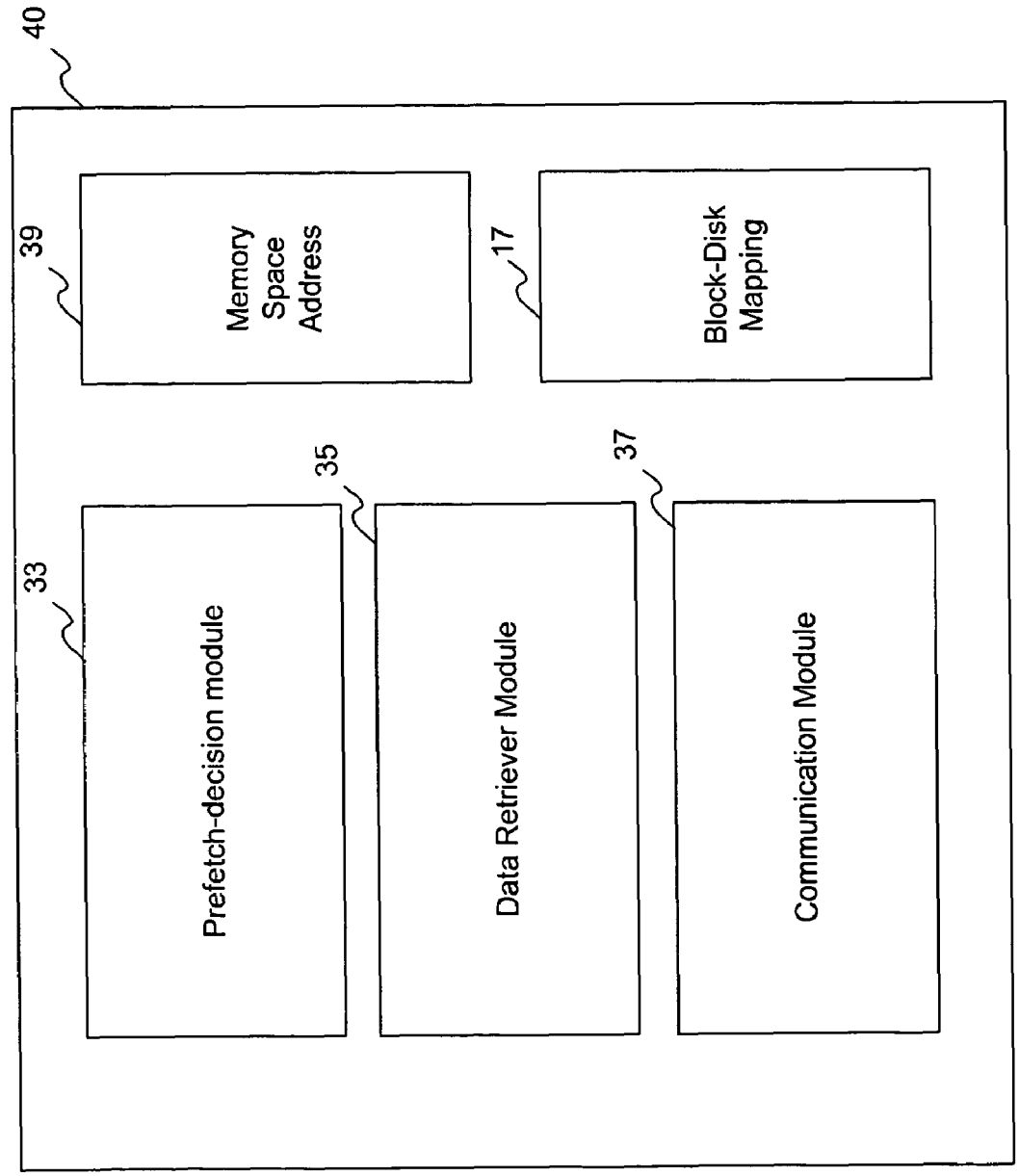
FIG. 3 is a schematic block diagram of a controller having prefetching and communication modules and functionality, in accordance with some embodiments of the present invention.

As part of either a disk controller 30, cache controller 15, IF 20, or as part of any other logic circuits which may be associated with the system, according to some embodiments of the present invention, there may be a controller structurally and/or functionally similar to the exemplary controller shown in FIG. 3. FIG. 3 is a schematic block diagram of a disk controller associated with a mass data storage device, in accordance with some embodiments of the present invention. The disk controller 30 may include a prefetch-decision module 33, a communication module 37, and a copy of block-drive map 17. In accordance with further embodiments of the present invention, the disk controller 30 may also include a data retriever module 35 and a memory space address 39.

In accordance with some embodiments of the present invention, the prefetch-decision module 33 may be adapted to identify the presence of one or more prefetch-triggering criterion in the recent I/O activities. The prefetch-decision module 33 may be further adapted to define a prefetch task to be performed by data retriever module 35 either in the current disk controller 30 or in any other controller in the system.

In accordance with some embodiments of the present invention, the prefetch-decision module 33 may be adapted to interchange or exchange information, such as prefetch-related information, for example, with prefetch-decision modules 33 located in or associated with different disk controllers 30 in the system 10. The prefetch-decision module 33 may communicate with other disk controllers 30 associated with different disks 40 via communication module 37. The communication module 37 may be adapted to utilize any communication protocol known in the present or yet to be devised in the future, including, but not limited to the SCSI communication protocol.

In accordance with some embodiments of the present invention, the information exchanged between the various disk controllers 30 may relate to data blocks that fall under the responsibility of one, two or more of the controllers 30. In accordance with one exemplary embodiment of the present invention, a first controller associated with a first disk drive may transmit a signal to a second controller associated with a second disk drive informing the second controller that certain block or block stored on the second disk should be transmitted to cache 15. Those of ordinary skill in the art may appreciate that by enabling the first controller to communicate with the other controller may enable the prefetching of consecutive data blocks, for example consecutive blocks associated with single logical unit, even if the consecutive blocks are stored across two or more disks.

In accordance with some embodiments of the present invention, the memory space 39 in the controller 30 or associated with the controller 30 may be used for temporarily storing data, such as for instance the data blocks retrieved from the disk 40 associated with the controller 30 which are to be sent to cache 15, or data blocks which have been written by cache 15 and which are to be written into disk 40 for permanent storage. The memory space 39 may be used to store other data as may be necessary in accordance with some embodiments of the present invention In accordance with some embodiments of the present invention, data retriever module 35 may be adapted to retrieve data from disk drive 40 into memory space 39, so that the data may be further transmitted to cache 15. In accordance with some embodiments of the present invention, the group or cluster of data blocks which are to be retrieved from the disk or disks 40 may be defined in terms of the reference number or symbol of the first block to be retrieved and the number (amount) of consecutive blocks which are to be retrieved from that point (that is from the first block) onwards. In accordance with some embodiments of the present invention, each data block or unit in the system may be referenced by serial numbers or by a combination of serial numbers and symbols. In accordance with further embodiments of the present invention, the group or cluster of data blocks which are to be retrieved from the disk or disks 40 may be defined in terms of the reference number or symbol within the logical data units of the first block to be retrieved and the number of consecutive blocks which are to be retrieved from that point onwards.

In accordance with some embodiments of the present invention, in response to receiving a request for data, the cache 15 may consult with the map 17 to determine on which disk 40 the first data block or unit to be retrieved is stored. The cache 15 may then generate a retrieval or prefetch request and may send the prefetch request to the controller 30 that is associated with the disk on which the first data block or unit to be retrieved is stored. The retrieval or prefetch request may include the reference number of the first data block or unit to be retrieved and the number of consecutive blocks which are to be retrieved from that point onwards.

In accordance with some embodiments of the present invention, the controller 30 may consult the map 17 to determine whether the data blocks requested by the cache 15 are all stored on the disk 40 that is associated with the controller 30. In accordance with some embodiments of the present invention, in case the controller 30 determines that all the requested data blocks are stored on the current disk drive 30, the retriever module 35 may communicates with the disk 30 using any communication protocol, such as the SCSI protocol, and may retrieve from the disk 30 the requested blocks. However, in accordance with some embodiments of the present invention, in case the controller 30 determines that one or more of the requested data blocks are stored on one or more other disks 40, the controller may communicated with the other controller(s) to notify that controller(s) 30 that one or more data blocks which are stored on the disk(s) associated with these controllers are requested by cache 15.

It should be noted that the embodiment shown in FIG. 3 and discussed hereinabove with reference to FIG. 3 relates to one exemplary embodiment of the disk controller in accordance with the present invention. Those well-versed in the art will readily notice that many other configurations are possible and may be used in accordance with some embodiments of the present invention.

Furthermore, in accordance with some embodiments of the present invention, upon receiving a request for one or more blocks associated with a given logical data unit, a first controller may use its communication module 37 to notify other controllers connected or other associated with mass storage devices which may hold data blocks associated with the given data unit. The first controller may notify the other controllers about the data blocks request, and prefetch decision module 33 on one or more of the other controllers 40 may then use the information about the blocks requested from the fist controller to determine whether a prefetch condition exists for prefetching some or all of the data blocks of the given logical data unit. Should any one controller 40 determine to prefetech some or all of the blocks, it may use the communication module to instruct other controllers to do so as well.

Reference is now made to FIG. 4 which is a flow chart illustrating an exemplary method of retrieving data into a cache memory from one or more mass data storage devices, in accordance with some embodiments of the present invention. In this embodiment, streams of sequential read requests may be identified. Whenever a stream is identified as having already been requested by a host, the system may be configured to read (e.g. prefetch) an additional amount of blocks that were not requested, but which blocks might be soon requested. The process described herein with reference to the embodiment shown in FIG. 4 refers to the identification of a "stream of sequential activity" and the initiation of a prefetch task. It should be understood, however, that in accordance with some embodiments of the present invention, the controller may be adapted to handle simultaneously more than one sequential stream and each of the associated prefetch tasks which may stem there from.

For convenience purposes in the description of FIG. 4 the symbol "N" shall be used to represent the threshold value which may be defined, for example, to be a number of consecutive blocks in a given logical data unit request (generated by a host) above which a sequential read activity may be deduced (i.e. condition or trigger for prefetching) to be underway in the system. In other words, when the number of consecutive blocks in a given request is greater the threshold N, a sequential read activity may be deduced to be underway in the system. It should be noted that in accordance with some embodiments of the present invention, the sequential read activity may be further determined to be associated with a specific logical data unit, for example, a logical data unit whose consecutive blocks may be requested in the read request.

The symbol "K" shall be used to represent the number of consecutive blocks in a given logical data unit that may be prefetched into cache upon determining that a sequential read activity is underway in the system.

The symbol "n" shall be used to represent the number of consecutive blocks requested thus far by host 52 within a given stream of sequential activity. The number n may be continually compared to threshold N.

The symbol "p" shall be used to represent the length in blocks of a set of blocks within a given logical data unit comprising an individual read request, or part of a larger read request, currently issued by host 52 to the current disk controller and transmitted to the disk controller by the IF via the cache.

It should be noted that although the two constant parameters N and K are described in the description of the embodiment shown in FIG. 4 to have been set once and for all, the present invention is not limited in this respect. Rather, either one or both parameters may be varied from time to time, either manually by a user or automatically, for example in accordance with periodical statistical measurement(s) indicating the system's performances. Such statistical measurement(s) may include, but are not limited to, the system's average throughput or latency over a given period of time, the degree of success of the prefetch activity in the recent past, etc. Those well-versed in the art will readily notice how these and other similar measurements can be performed and how they may affect the values assigned to the parameters N and K.

According to some embodiments of the present invention, cache 15 may transmit to the disk controller 30 a request for reading p successive blocks of data known to be in disk 40 to which the controller is associated (block 100). The prefetch-decision module 33 may check if the first block in this request is the block immediately following the last block of a sequential stream already defined in the current controller 30 (block 102). If the first block in this request is not the block immediately following the last block of a sequential stream already defined in the current controller 30, the prefetch-decision module 33 may establish a new sequential stream for the current logical data unit (block 106). The length of the new sequential stream for the current logical data unit may be p blocks for example. However, if the first block in this request is the block immediately following the last block of a sequential stream already defined in the current controller 30, the prefetch-decision module 33 may add the new p successive blocks to an existing stream n and may update the length of the stream to be n+p (block 104). Accordingly, the last block of the new stream may become the last block of the existing stream.

In accordance with some embodiments of the present invention, once the length of the stream has been updated the prefetch-decision module 33 may check whether the new length the stream which is now equal to n+p is still below the threshold N (block 108). In case the new length of the stream is equal to or longer then N, the threshold may have been reached, and the prefetch-decision module 33 may create a new prefetch task (block 110).

In accordance with some embodiments of the present invention, upon creating a new prefetch task the next K successive blocks in the logical data unit may be fetched into the cache 15. In accordance with further embodiments of the present invention, as part of the prefetch task, the prefetch-decision module 33 may consult the map 17 to determine the distribution or location of some or all the K consecutive blocks across the various disk drives 40 in the system 10. In accordance with yet further embodiments of the present invention, the prefetch-decision module 33 may signal the retriever modules 35 of each controller 30, which blocks stored on the disk or disks associated with each of the controllers are to be prefetched. The communication between the controller creating the prefetch task and the controller(s) associated with the disk on which store some portion of the blocks to be prefetched are stored may be enabled via the communication modules 37 of each of the controllers.

In accordance with some embodiments of the present invention, in case the threshold N has not been reached, module 33 may check if the next successive block in the current logical data unit is stored on a disk associated with the current controller and is thus still within the domain of responsibility of the current controller (block 112). If the next successive block in the current logical data unit is stored on the disk associated with the controller, then the controller may indicate to the prefetch-decision module 33, for future reference, that the next successive block in the current logical data unit is stored on the disk associated with the current controller, (for example by writing to a memory unit associated with the controller). In this case, when the host 52 eventually requests from the current controller 30 the block immediately following the last block in the current LU, the prefetch-decision module 33 may already be informed that the first of the next consecutive blocks in the current logical data unit is stored on the disk associated with the current controller and may thus proceed directly to block 104, in which the prefetch-decision module 33 may add the length of the newly requested p successive blocks to the length existing stream n and may set the length of the stream to be n+p.

However, in accordance with some embodiments of the present invention, in case in block 112 it is determined that the next successive block in the current LU is not stored on a disk associated with the current controller, or in other words, it is determined that the next successive block in the current LU is not within the domain of responsibility of the current controller, then prefetch-decision module 33 may signal a different controller (or controllers) to inform that controller(s) of the existence of the current stream and of its length n. In accordance with some embodiments of the present invention, the prefetch-decision module 33 may consult the map 17 to determine which is(are) the controller(s) that is responsible for the block in question and may signal that controller via communication modules 37 to inform that controller of the existence of the current stream and of its length n. In this case, when the host 52 eventually requests from the controller (via cache for example) a stream of consecutive data blocks starting with the block immediately following the last block an existing requested stream, the prefetch-decision module 33 may already be informed that the currently requested stream may be successive to an existing stream and may thus automatically proceed directly to block 104, in which the prefetch-decision module 33 may add the length of the currently requested stream p to the length of the existing stream n and may update the length of the stream to be n+p. It should be noted that in this case, the two successive streams which may eventually be joined together (for example, after it has been determined that the combined length of the two successive streams is below the threshold N (block 108)) may have been originally stored on two or more separate disks and have been under the responsibility of two or more controllers.

It should be noted that the embodiment illustrated by FIG. 4 and described hereinabove with reference to FIG. 4 is exemplary in nature. Those of ordinary skill in the art may readily notice how to modify, expand and generalize the scope of the method illustrated in FIG. 4 Furthermore, in accordance with some embodiments of the present invention, the decision prefetch two or more blocks from a disk or disks into the cache may be based upon various different criteria and is not limited to the criteria described hereinabove. In addition, it should be noted that in accordance with some embodiments of the present invention, the prefetch requests may relate to other patterns or sequences of blocks to be fetched and/or may not be limited to merely receiving sequential streams of read requests.

Thus, as is exemplified in the description of the embodiments of the present invention illustrated in FIG. 4, both the decision to prefetch and the actual operation of prefetching the data to cache may be performed in a distributed manner. In other words, the decision to prefetch may be reached based on a criterion that pertains to data contained in more than one controller and/or mass data storage device. Furthermore, the individual tasks defined in the system for prefetching data into cache may also pertain to data stored on more than one disk drive, and these tasks may be carried out by fetching into cache data stored in more than one disk drive.

According to some embodiment of the present invention, time may play a factor in determining where a sequential read operation is underway. If the time between consecutive read requests to a specific logical data unit exceeds some predefined limit, the request may not be recognized as part of the same stream, and thus may not be combined to contribute to the determination of a prefetch condition for the given logical data unit.

Although the flow chart of FIG. 4 illustrates the steps of a specific method to determine a prefetch condition based on the detection of streams of consecutive data read requests, either on a single controller or across multiple controllers, one of ordinary skill in the art will understand that a prefetch trigger or condition can be defined and detected in a countless number of ways, some of which were described related applications and incorporated herein by reference. Once a controller shares information about which data blocks have been requested of it with other controllers associated which may have access to data blocks related to the requested data blocks (e.g. data blocks from the same logical unit), one or more of the controllers may detect a prefetch condition for the given logical unit based on read quests it has received combined with the read requests one or more of the controllers has also received.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A circuit for retrieving some or all of the data blocks of a logical unit into a cache from one or more mass data storage devices, said system comprising:
    a cache memory; and
    two or more controllers,
    wherein each of said controllers includes a communication module and is associated with one or more mass data storage devices;
    wherein a first controller is adapted to cause a second controller to retrieve a data block associated with a logical unit by transmitting a signal to the second controller via their respective communication modules;
    wherein said first controller is adapted to signal one or more other controllers whether it has received one or more data block requests associated with the logical unit; and
    wherein at least one prefetch decision module is adapted to trigger the retrieval of data blocks based on data block requests received by a controller with which it is associated and/or based on data block requests received by other controllers.

2. The circuit according to claim 1, further comprising one or more prefetch decision modules, wherein each said decision module is associated with a controller and is adapted to determine whether to trigger retrieval of some or all of the data blocks of a logical unit based on one or more received data block requests.

3. A system for retrieving some or all of the data blocks of a logical unit into a cache from one or more mass data storage devices, said system comprising:
    a cache memory;
    a host device; and
    two or more controllers,
    wherein each of said controllers includes a communication module and is associated with one or more mass data storage devices;
    wherein a first controller is adapted to cause a second controller to retrieve a data block associated with a logical unit by transmitting a signal to the second controller via their respective communication modules,
    wherein said first controller is adapted to signal one or more other controllers whether it has received from the host device one or more data block requests associated with the logical unit, and
    wherein at least one prefetch decision module is adapted to trigger the retrieval of data blocks based on data block requests received by a controller with which it is associated and/or based on data block requests received by other controllers.

4. The system according to claim 3, further comprising one or more prefetch decision modules, wherein each said decision module is associated with a controller and is adapted to determine whether to trigger retrieval of some or all of the data blocks of a logical unit based on one or more received data block requests.

5. A method of retrieving data blocks into a cache from one or more mass storage devices, comprising:
    determining based on one or more data requests received by one or more controllers that some or all of the data blocks associated with a logical unit should be prefetched;
    retrieving by two or more controllers some or all of the data blocks associated with the logical unit into the cache;

transmitting by a first controller a signal to a second controller instructing the second controller to retrieve data blocks associated with a logical unit upon the first controller determining that some or all of the data blocks associated with the logical unit should be prefetched into the cache; and transmitting by the first controller a signal to a plurality of controllers instructing the controllers to retrieve data blocks associated with a logical unit upon the first controller determining that some or all of the data blocks associated with the logical unit should be prefetched into the cache.

6. A method of retrieving data blocks into a cache from one or more mass storage devices, said method comprising:

determining based on one or more data requests received by one or more controllers that some or all of the data blocks associated with a logical unit should be prefetched; and retrieving by two or more controllers some or all of the data blocks associated with the logical unit into the cache;

wherein determining comprises a first controller receiving a signal from at least a second controller indicating that the second controller received one or more requests for a data block associated with the logical unit, wherein determining comprises the first controller receiving a request for a block associated with the logical unit, and wherein the determining that some or all of the data blocks associated with the logical unit should be prefetched into the cache is based on data block requests received by the first controller and based on signal received from at least one other controller indicating that the other controller has also received a request for the data at least one data block associated with the logical unit.

* * * * *